United States Patent
Weigand et al.

(10) Patent No.: US 11,611,175 B2
(45) Date of Patent: Mar. 21, 2023

(54) PLUG-IN CONNECTOR WITH A LOCKING MECHANISM

(71) Applicant: ODU GmbH & Co. KG, Mühldorf a. Inn (DE)

(72) Inventors: Josef Weigand, Heldenstein (DE); Stefan Seibuchner, Pleiskirchen (DE)

(73) Assignee: ODU GmbH & Co. KG, Mühldorf a. Inn (DE)

( * ) Notice: Subject to any disclaimer, the term of this patent is extended or adjusted under 35 U.S.C. 154(b) by 0 days.

(21) Appl. No.: 17/012,195

(22) Filed: Sep. 4, 2020

(65) Prior Publication Data
US 2021/0075157 A1 Mar. 11, 2021

(30) Foreign Application Priority Data
Sep. 6, 2019 (EP) ..................................... 19196039

(51) Int. Cl.
*H01R 13/62* (2006.01)
*H01R 13/627* (2006.01)
*H01R 13/17* (2006.01)
*H01R 13/434* (2006.01)

(52) U.S. Cl.
CPC ......... *H01R 13/6272* (2013.01); *H01R 13/17* (2013.01); *H01R 13/434* (2013.01)

(58) Field of Classification Search
CPC ...... H01R 13/15; H01R 13/17; H01R 13/434; H01R 13/436; H01R 13/627; H01R 13/6272; H01R 13/6273; H01R 13/6276; H01R 13/6277; H01R 13/2678
See application file for complete search history.

(56) References Cited

U.S. PATENT DOCUMENTS

| | | | |
|---|---|---|---|
| 4,047,779 A * | 9/1977 | Klancnik | F16B 9/054 439/304 |
| 5,129,836 A | 7/1992 | Ursich | |
| 7,192,303 B2 | 3/2007 | Kohen | |
| 8,764,473 B2 | 7/2014 | Kamatsubara | |
| 2005/0148241 A1 | 7/2005 | Kohen | |
| 2005/0220425 A1* | 10/2005 | Kropp | G02B 6/4292 385/88 |
| 2013/0210258 A1 | 8/2013 | Retailleau et al. | |

(Continued)

FOREIGN PATENT DOCUMENTS

DE 10 2016 105 975 A1 10/2007
JP 55105586 7/1980
(Continued)

*Primary Examiner* — Truc T Nguyen
(74) *Attorney, Agent, or Firm* — WC&F

(57) ABSTRACT

A connecting plug includes a locking pin arranged at a connector face. The locking pin has at least one latching element and a counter-piece. The latching element is configured for engaging with at least one counter-latching element of a second connector part. The locking pin includes a spring element configured for resiliently pressing the at least one latching element and the counter-piece against each other. The counter-piece is shaped and configured for pressing the at least one latching element in a radially outward direction and for positively locking the at least one latching element in an engaged position as soon as the at least one latching element is engaged with the at least one counter-latching element.

15 Claims, 7 Drawing Sheets

(56) References Cited

U.S. PATENT DOCUMENTS

| | | | | |
|---|---|---|---|---|
| 2016/0025823 A1* | 1/2016 | Driemel | ............ | G01R 33/34007 600/422 |
| 2018/0006403 A1* | 1/2018 | Dong | .................... | H01R 4/184 |
| 2018/0323556 A1 | 11/2018 | Storione et al. | | |
| 2019/0115693 A1* | 4/2019 | Troeger | ............. | H01R 13/6276 |
| 2020/0036133 A1* | 1/2020 | Komatsubara | ..... | H01R 13/6276 |

FOREIGN PATENT DOCUMENTS

| | | |
|---|---|---|
| JP | S6037421 Y2 | 11/1985 |
| JP | 6037421 B2 | 12/2017 |
| RU | 2 508 581 C1 | 2/2014 |
| RU | 2 658 299 C1 | 6/2018 |
| SU | 1001253 A1 | 2/1983 |
| WO | 2000/16442 A2 | 3/2000 |

\* cited by examiner

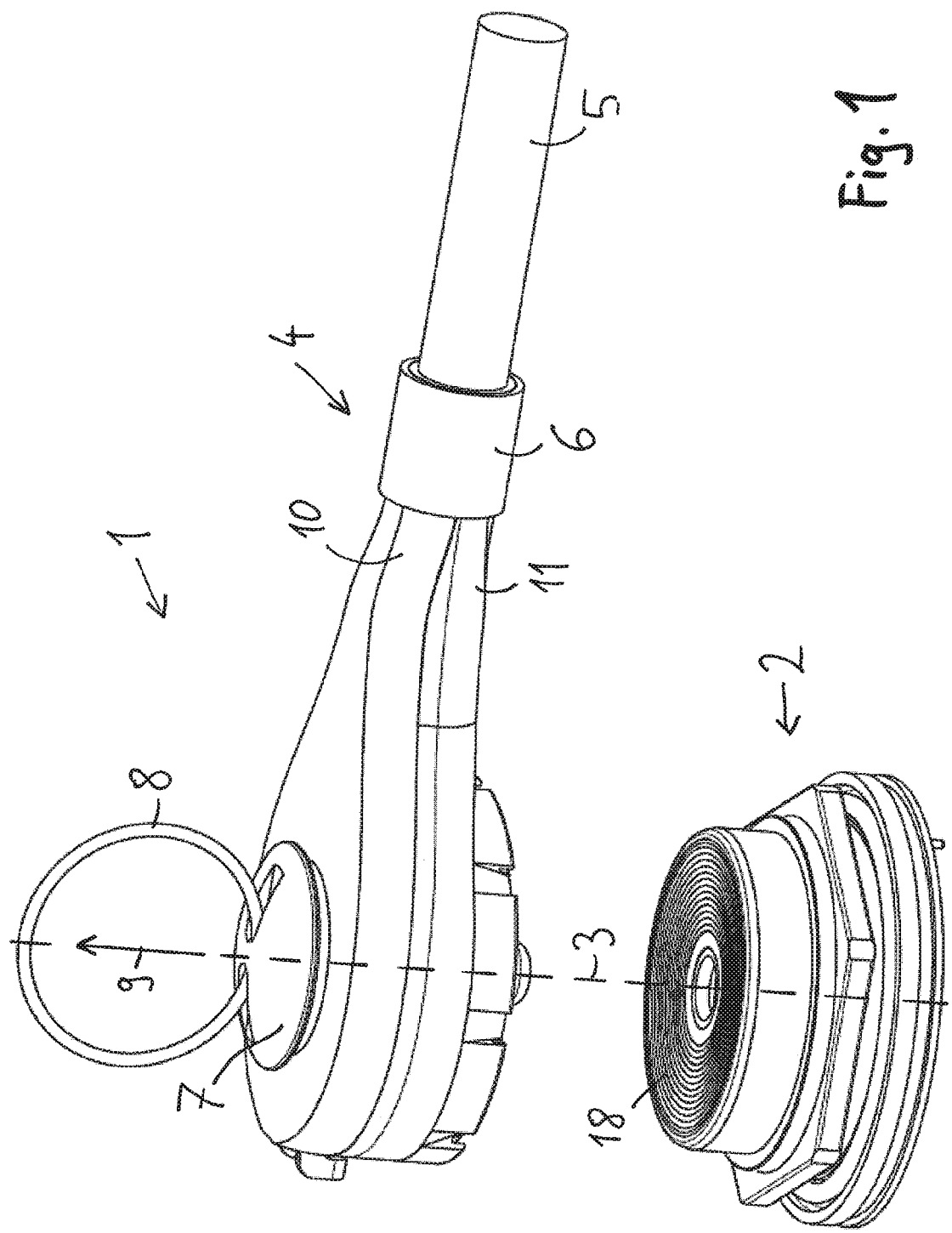

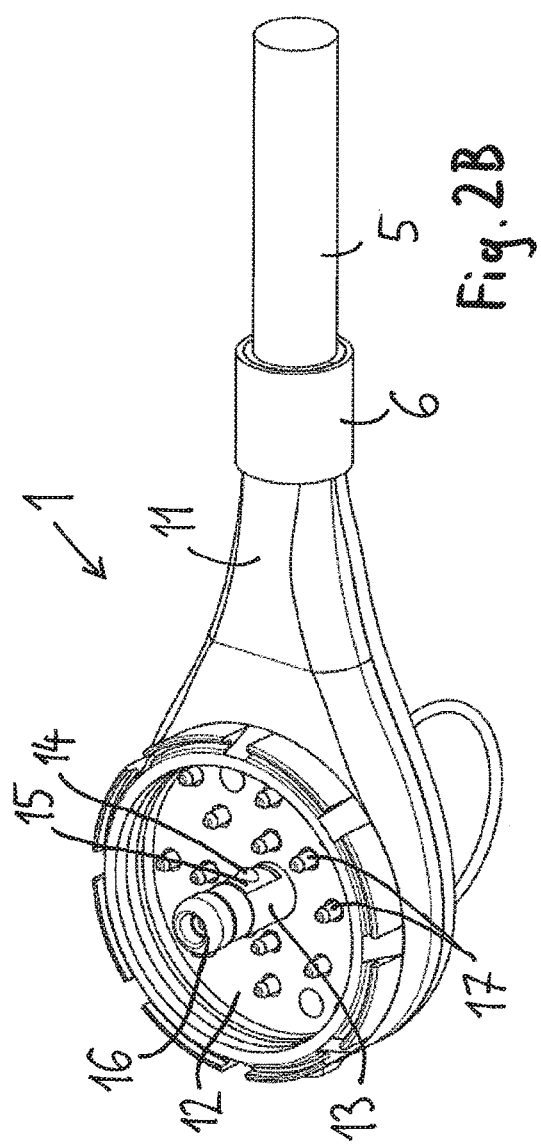
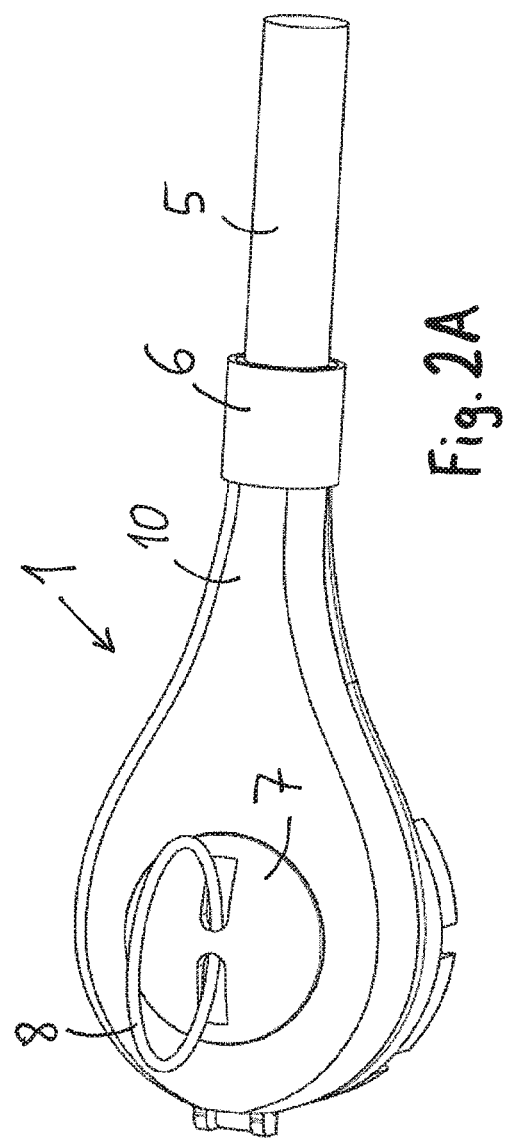
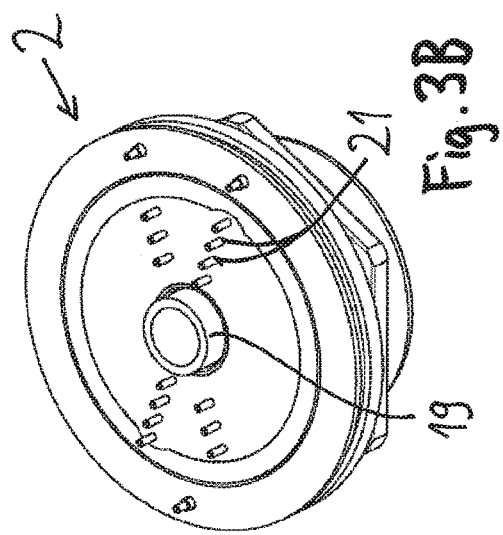
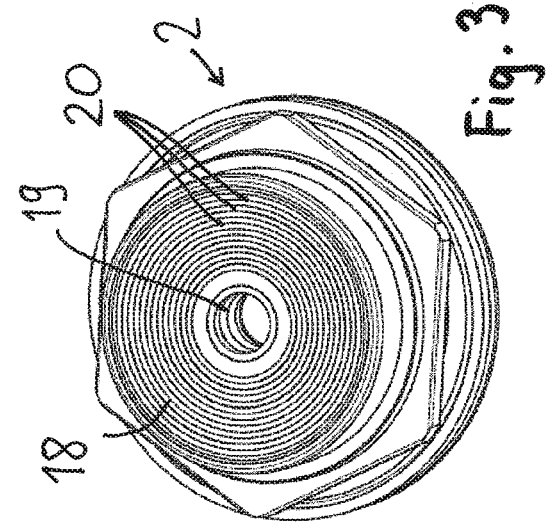

PLUG-IN CONNECTOR WITH A LOCKING MECHANISM

FIELD OF THE INVENTION

The invention relates to a connecting plug. The invention further relates to a plug-in connector comprising a connecting plug and a second connector part.

BACKGROUND OF THE INVENTION

In U.S. Pat. No. 7,192,303 B2, a device for connecting and supporting electrical fixtures is described. The device includes a male electrical plug, a mating female electrical socket and a releasable latch assembly for both holding the plug in the socket and mechanically mounting the fixture on a supporting surface or an electrical box. The plug is provided with concentric, ring shaped male connectors that are matingly received within similarly shaped female recesses in the socket to allow the fixture to be rotated to any of a plurality or mounting orientations. The releasable latch assembly is controlled by the stroke of a simple push rod operated by a user's thumb or finger.

German patent application DE 10 2016 105 975 A1 describes a locking device for plug connectors. The locking device comprises a first locking means and a second locking means. The two locking means can be plugged together and engaged with one another. At least one blocking element is provided for engaging the first locking means with the second locking means. The blocking element is suitable for mechanical engaging and can be actuated and released via an actuator. In addition, another actuator is arranged in the first locking means or in the second locking means to protect against failure of the locking device. The first locking means and the second locking means are provided for use in a plug and a corresponding counter plug.

International patent application WO 2000/16442 A2 discloses a socket and plug combination for conducting electric power and for mechanically supporting an appliance. The combination comprising: a) a socket rigidly attachable to a wall or ceiling, the socket including at least two spaced-apart hollow receptacles connectable to an electric power supply, the socket also comprising a mechanical connection first element; b) a plug rigidly attachable to and configured to mechanically support an appliance, the plug supporting at least two projecting prongs engageable with the two hollow receptacles and connectable to conductors for feeding electric power to the appliance; c) releasable latching means attached to the combination providing the retention force between the socket and the plug to support the appliance.

In US patent application US 2018/0323556 A1, a multi-polar connector is described. The connector comprises a base of substantially cylindrical form and a plug, connectable to the base in a removable manner to the base, in which are disposed a plurality of contacts. The base comprises a conducting face on or in which is disposed at least one conducting track forming at least one arc of a circle whose centre is substantially coincident with the centre of the conducting face; said track furthermore being disposed in such a way as to permit a mechanical electrical coupling with one of said contacts.

US patent U.S. Pat. No. 8,764,473 B2 describes a ball-lock connector. Ball storage holes are formed in a tubular member, and engagement balls are contained in the ball storage holes. An inner sleeve and an outer sleeve are disposed on the outside of the tubular member so as to move in the axial direction. When a counterpart connector is attached, each engagement ball moves from a first position wherein a part of the engagement ball is projected from the inner peripheral surface of the tubular member to a second position which is close to a first inner peripheral surface of an outer sleeve, wherein a part of the engagement ball is not projected from the inner peripheral surface, and thereafter, returns to the first position. When the counterpart connector is detached, each engagement ball moves from the first position to a third position which is close to a second inner peripheral surface of the outer sleeve, wherein a part of the engagement ball is not projected from the inner peripheral surface, and thereafter, returns to the first position. Thus, a connector which has a relatively small diameter and which can be smoothly attached or detached, is realized at low cost.

OBJECT OF THE INVENTION

The object of the invention is to provide a connecting plug and a plug-in connector that provide for a secure and reliable connection, allows for convenient handling and are especially suited for use in the field of wearable technology. Use of the connecting plug and the plug-in connector is not limited to this technical field, though.

SUMMARY OF THE INVENTION

According to the invention, a connecting plug is provided. The connecting plug comprises a locking pin arranged at the connector face of the connecting plug, the locking pin comprising at least one latching element and a counter-piece, wherein the at least one latching element is configured for engaging with at least one counter-latching element of a second connector part. The locking pin comprises a spring element configured for resiliently pressing the at least one latching element and the counter-piece against each other. The counter-piece is shaped and configured for pressing the at least one latching element in a radially outward direction and for positively locking the at least one latching element in the engaged position as soon as the at least one latching element is engaged with the at least one counter-latching element.

In addition to the at least one contact element for establishing electrical connections, the connecting plug of the present invention further comprises a locking pin that is suited for establishing a secure and reliable mechanical connection with a second connector part when the connecting plug is mated with the second connector part. The locking pin comprises at least one latching element configured for engaging with at least one counter-latching element when the connecting plug and the second connector part are mated. According to the present invention, the locking pin further comprises a counter-piece. A counter-piece is an additional element of the locking pin, wherein the counter-piece and the at least one latching element are resiliently pressed against each other. The counter-piece fulfills two different functions. Firstly, due to the interaction of the counter-piece with the at least one latching element, the latching elements are resiliently pressed in a radially outward direction of the locking pin. Thus, the at least one latching element can resiliently engage with a corresponding counter-latching element. Secondly, the counter-piece is shaped and configured for positively locking the at least one latching element in the engaged position. In the engaged position, the at least one latching element is engaged with the at least one counter-latching element. The counter-piece serves both as a pressing element and as a locking element configured for locking the engagement between the at least one latching element and the at least one counter-latching element. Thus, it is made sure that the connecting plug cannot be detached from the second connector part inadvertently. A secure and reliable connection between the connecting plug and the second connector part is established. For mating the connecting plug and the second connector part, the connecting plug is simply pushed onto the second connector part until the latching elements engage.

Further according to the invention, a connecting plug is provided. The connecting plug comprises a locking pin with at least one latching element, a holder element for holding the at least one latching element and a counter-piece, wherein the at least one latching element is configured for engaging with at least one counter-latching element of a second connector part, wherein the counter-piece is shaped and configured for positively locking the at least one latching element in the engaged position. The holder element with the at least one latching element is movably arranged in or at the locking pin and the counter-piece is fixed to the locking pin. The locking pin is configured such that in the engaged position of the at least one latching element, the at least one latching element can be released by moving the holder element relative to the counter-piece.

In addition to the contact element, the connecting plug comprises a locking pin for establishing a stable mechanical connection with the second connector part. The locking pin comprises a holder element. A holder element is a part that is configured for supporting the at least one latching elements. For example, in case balls are used as latching elements, the holder is a ball cage. The latching elements are configured for latching with corresponding counter-latching elements of a second connector part. The locking pin further comprises a counter-piece that is resiliently pressed against the latching elements. According to the invention, the counter-piece is implemented as a stationary component that is fixed to the connecting pin, whereas the holder element with the latching elements is implemented as a movable part. The holder element with the latching elements is resiliently pressed against the stationary counter-piece by means of a spring element. According to the invention, it has been found that it is advantageous to implement the counter-piece as a stationary component, because such an implementation allows for a more stable and reliable locking of the latching elements in the engaged position. Especially in case of vibrations, a stationary counter-piece allows for reliably locking the connection between the connecting plug and the second connector part.

Yet further according to the invention, a plug-in connector comprising a connecting plug and a second connector part is provided. The connecting plug comprises a locking pin with at least one latching element and a counter-piece. The connecting plug further comprises at least one first contact element. The second connector part comprises a locking sleeve with at least one counter-latching element, the locking sleeve being configured for accepting the locking pin when the connecting plug is mated with the second connector part, wherein the at least one latching element is configured for engaging with the at least one counter-latching element of the locking sleeve. The second connector part further comprises at least one second contact element configured for electrically contacting the at least one first contact element. The locking pin comprises a spring element configured for resiliently pressing the at least one latching element and the counter-piece against each other. The counter-piece is shaped and configured for pressing the at least one latching element in a radially outward direction and for positively locking the at least one latching element in the engaged position as soon as the at least one latching element is engaged with the at least one counter-latching element.

With regard to the connecting plug, terms such as "front end", "rear end", "front face", "rear part" relate to the connecting plug's mating direction. The mating direction of the connecting plug is the direction in which the connecting plug is inserted into a second connector part. With regard to the second connector part, terms such as "front end", "rear end", "front face", "rear part" relate to the second connector part's mating direction, which is opposite to the connecting plug's mating direction. Accordingly, the front end of the second connector part is the part of the second connector part that receives the plug's front end first. Terms like "radially inwards direction" and "radially outwards direction" relate to centre axis of the connecting plug in the axial direction, which corresponds to the connecting plug's mating direction.

Further according to the invention, a plug-in connector comprising a connecting plug and a second connector part is provided. The connecting plug comprises a locking pin with at least one latching element. The connecting plug further comprises an actuating member movably arranged in or at the locking pin, and at least one first contact element disposed around the locking pin. The second connector part comprises a locking sleeve with at least one counter-latching element, the locking sleeve being configured for accepting the locking pin when the connecting plug is mated with the second connector part, wherein the at least one latching element is configured for engaging with the at least one counter-latching element of the locking sleeve. The second connector part further comprises at least one second contact element configured for electrically contacting the at least one first contact element. The locking pin and the locking sleeve are shaped and configured for positively locking the at least one latching element as soon as the at least one latching element is engaged with the at least one counter-latching element. Furthermore, the locking pin and the locking sleeve are shaped and configured such that disengagement of the at least one latching element requires actuation of the actuating member. The locking pin is configured for being inserted into the locking sleeve without actuating the actuating member.

When the locking pin is inserted into the locking sleeve, the at least one springy latching element or the at least one latching element preloaded by a spring force is pushed in a radially inwards direction and the locking pin is inserted into the locking sleeve until the at least one latching element engages with the at least one counter-latching element. Thus, mating the connecting plug and the second connector part is effected without actuating the actuation member, and for this reason, mating the connecting plug and the second connector part is simple and intuitive.

Further according to the invention, a plug-in connector comprising a connecting plug and a second connector part is provided. The connecting plug comprises a locking pin with at least one latching element, a holder element for holding the at least one latching element and a counter-piece. The second connector part comprises a locking sleeve with at least one counter-latching element, the locking sleeve being configured for accepting the locking pin when the connecting plug is mated with the second connector part. The at least one latching element is configured for engaging with the at least one counter-latching element of the second connector part, wherein the counter-piece is shaped and configured for positively locking the at least one latching element in the engaged position. The holder element with the at least one latching element is movably arranged in or at the locking pin and the counter-piece is fixed to the locking pin. The locking pin is configured such that in the engaged position of the at least one latching element, the at least one latching element can be released by moving the holder element relative to the counter-piece.

Further according to the invention, a plug-in connector comprising a connecting plug and a second connector part is provided. The connecting plug comprises a locking pin with at least one latching element and a counter-piece. The second connector part comprises a locking sleeve with at least one counter-latching element, the locking sleeve being configured for accepting the locking pin when the connecting plug is mated with the second connector part. The at least one latching element is configured for engaging with the at least one counter-latching element of the second connector part, wherein the counter-piece is shaped and configured for positively locking the at least one latching element in the engaged position. The at least one counter-latching element and the counter-piece are shaped and configured such that in the engaged position of the at least one latching element, a force exerted on the at least one latching element by the at least one counter-latching element and the counter-piece does not comprise a force component suited for moving the at least one latching element in a radially inwards direction.

In this solution, the geometry of the counter-latching elements and the counter-piece is such that these elements do not exert a force on the at least one latching element that includes a force component for driving the latching elements in a radially inwards direction. Accordingly, as soon as the at least one latching element is engaged with the at least one counter-latching element, the engagement is locked.

Yet further according to the invention, a plug-in connector comprising a connecting plug and a second connector part is provided. The connecting plug comprises a locking pin with at least one latching element and a counter-piece. The connecting plug further comprises at least one first contact element. The second connector part comprises a locking sleeve with at least one counter-latching element, the locking sleeve being configured for accepting the locking pin when the connecting plug is mated with the second connector part, wherein the at least one latching element is configured for engaging with the at least one counter-latching element of the locking sleeve. The second connector part further comprising at least one annular contact element configured for electrically contacting the at least one first contact element. The connecting plug is an angular connector.

In this solution, a locking mechanism comprising a locking pin and a locking sleeve is provided, in order to establish a secure and reliable mechanical connection. In this solution, the connecting plug is implemented as an angular connector. An angular connector is a connector in which the cable orientation is oriented in a direction that differs from the axial direction of the connecting plug. The locking mechanism of the present invention is especially suited for angular connectors. For mating the angular connector with the second connector part, the angular connector is simply pushed onto the second connector part until the latching elements engage. Due to the annular shape of the contact elements, the angular connector can be mated with the second connector part in any angular orientation. Thus, handling of the plug-in connector is simplified.

Further according to the invention, a connecting plug is provided. The connecting plug comprises a locking pin with at least one latching element, wherein the at least one latching element is configured for engaging with at least one counter-latching element of a second connector part. The connecting plug further comprises at least one contact element disposed around the locking pin, and an actuating member movably arranged in or at the locking pin. The at least one latching element is configured for engaging with the at least one counter-latching element of the locking sleeve, wherein the at least one latching element and the at least one counter-latching element are shaped and configured such that the at least one latching element is positively locked as soon as the at least one latching element is engaged with the at least one counter-latching element. The at least one latching element is realised as at least one springy latching element or as at least one latching element preloaded by a spring force, the at least one latching element being configured for being resiliently pressed in a radially outward direction of the locking pin. The actuating member is configured for interacting with the at least one latching element in a way that upon actuation of the actuating member, at least portions of the at least one latching element are moved in a radially inwards direction and disengage from the at least one counter-latching element.

Yet further according to the invention, a plug-in connector comprising a connecting plug and a second connector part is provided. The connecting plug comprises a locking pin with at least one latching element. The connecting plug further comprises at least one first contact element disposed around the locking pin and an actuating member movably arranged in or at the locking pin. The second connector part comprises a locking sleeve with at least one counter-latching element, the locking sleeve being configured for accepting the locking pin when the connecting plug is mated with the second connector part. The at least one latching element is configured for engaging with the at least one counter-latching element of the locking sleeve, wherein the at least one latching element and the at least one counter-latching element are shaped and configured such that the at least one latching element is positively locked as soon as the at least one latching element is engaged with the at least one counter-latching element. The second connector part further comprises at least one second contact element for electrically contacting the at least one first contact element. The at least one latching element is realised as at least one springy latching element or as at least one latching element preloaded by a spring force, the at least one latching element being configured for being resiliently pressed in a radially outward direction of the locking pin. The actuating member is configured for interacting with the at least one latching element in a way that upon actuation of the actuating member, at least portions of the at least one latching element are moved in a radially inwards direction and disengage from the at least one counter-latching element.

PREFERRED EMBODIMENTS OF THE INVENTION

Preferred features of the invention which may be applied alone or in combination are discussed below and in the dependent claims.

Preferably, the locking pin comprises a holder element configured for holding the at least one latching element. The holder and the latching elements may for example be separate parts. Alternatively, the holder element and the at least one latching element may for example be formed in one piece. The holder element may for example be a cage configured for holding the one or more latching elements. Preferably, the at least one latching element is implemented as at least one springy latching element or as at least one latching element preloaded by a spring force. Preferably, the at least one latching element is configured for being resiliently pressed in a radially outwards direction of the locking pin. For example, the at least one latching element may be held in the holder element such that a radial movement of the at least one latching element is possible.

Preferably, the locking piece comprises a counter-piece. Preferably, at least one of the holder element and the counter-piece is movably arranged in or at the locking pin. Further preferably, the holder element and the counter-piece are configured for being movable relative to each other in the axial direction of the locking pin. For example, the holder element and the counter-piece may be configured for being resiliently pressed against each other. Thus, the counter-piece can act on the latching elements and urge the latching elements in a radially outwards direction of the locking pin.

In a preferred embodiment, the locking pin comprises a spring element, wherein the spring element is configured for pressing the at least one latching element and the counter-piece against each other. For example, the locking pin may comprise a spring element configured for resiliently pressing the at least one latching element and the counter-piece against each other, with the counter-piece shaped such that the at least one latching element is resiliently pressed in a radially outward direction by the counter-piece. The counter-piece may for example be shaped and configured for interacting with the at least one latching element and for resiliently pressing the at least one latching element in a radially outwards direction.

Preferably, the counter-piece has an approach surface. Further preferably, the counter-piece has a slanted approach surface. A slanted approach surface allows for a well-defined interaction with the latching elements. Preferably, the approach surface of the counter-piece is configured for interacting with the at least one latching element and for resiliently pushing the at least one latching element in a radially outwards direction of the locking pin.

In a preferred embodiment, the connecting plug comprises an actuating member, the actuating member being configured for unlocking, upon actuation, the engagement between the at least one latching element and the at least one counter-latching element and for releasing the at least one latching element.

In a preferred embodiment, the actuating member is configured for being movable in an axial direction of the connecting plug. By actuating the actuating member in the axial direction, the engagement between the latching elements and the counter-latching elements can be unlocked.

Preferably, the actuating member is configured to be actuated by pulling the actuating member in the axial direction of the connecting plug. Further preferably, the actuating member is configured to be actuated by pulling the actuating member in a direction opposite to the mating direction of the connecting plug. The actuating member may for example be configured such that actuating the actuating member causes a relative movement between the at least one latching element and the counter-piece in the axial direction. For example, by actuating the actuating member, the holder element may be moved away from the counter-piece and the at least one latching element is released.

According to a preferred embodiment, the holder element with the at least one latching element is movably arranged in or at the locking pin and the counter-piece is fixed to the locking pin. The counter-piece serves as a locking member for the latching elements. By providing a stationary counter-piece that is fixed to the locking pin, a stable locking of the latching elements in the engaged position is accomplished. Preferably, the counter-piece is a stationary dome-shaped counter-piece.

Preferably, the holder element with the at least one latching element is movably arranged in or at the locking pin, the locking pin being configured such that in the engaged position of the at least one latching element, the at least one latching element can be released by moving the holder element relative to the counter-piece.

Preferably, the locking pin comprises a spring element, the spring element being configured for pushing the holder element towards the counter-piece. In this regard, the holder element is a spring-loaded holder element. Preferably, the actuating member is mechanically coupled with the holder element. Further preferably, the actuating member is configured for moving, upon actuation, the holder element away from the counter-piece against the spring force of the spring element. Thus, upon actuation of the actuating member, the latching elements are released.

According to an alternatively preferred embodiment, the counter-piece is movably arranged in or at the locking pin and the holder element with the at least one latching element is fixed to the locking pin. In this embodiment, the counter-piece is implemented as a movable part, whereas the holder element is fixed.

Preferably, the at least one counter-latching element is at least one of: a recess, a groove, at least one indentation, a circumferential recess, a circumferential groove.

Preferably, the at least one latching element is implemented as at least one rolling element. Further preferably, the holder element is implemented as a cage configured for holding the at least one rolling element. By implementing the latching elements as rolling elements, the functional surfaces have curved surfaces.

Preferably, the at least one latching element is implemented as at least one ball. Further preferably, the holder element is implemented as a ball cage configured for holding the at least one ball. A ball lock pin of this kind provides a stable mechanical connection between the connecting plug and the second connector part. Preferably, the at least one latching element is at least one ball and the holder element is a ball cage configured for holding the at least one ball in a way that the at least one ball can be pressed in a radially inwards direction.

Preferably, mating the connecting plug and the second connector part does not require actuating the actuating member. The latching elements are resiliently supported and can be pressed in a radially inwards direction, and therefore, the locking pin can be introduced into the locking sleeve without actuating the actuating member. Preferably, the locking pin is configured for being inserted into the locking sleeve without actuating the actuating member until the at least one latching element engages with the at least one counter-latching element. Preferably, the locking pin is configured for being inserted into the locking sleeve without requiring actuation of the actuating member. Hence, mating the connecting plug and the second connector part is preferably effected without actuating the actuating member. For example, mating of the connecting plug and the second connector part can even be effected in case the user pushes on the actuating member during the mating process. For example, the at least one latching element is configured for being resiliently pushed in a radially inwards direction when the locking pin is inserted into the locking sleeve. Further preferably, the at least one latching element is configured for being resiliently pushed in a radially inwards direction against a resilient force exerted by the counter-piece.

According to a further preferred embodiment, unmating the connecting plug and the second connector part requires actuating the actuating member.

Preferably, as soon as the at least one latching element engages with the at least one counter-latching element, the engagement is locked. In this regard, as soon as the at least one latching element engages with the at least one counter-latching element, the at least one latching element may for example be positively locked by the counter-piece. Preferably, after the at least one latching element is engaged with the at least one counter-latching element, it is no longer possible to unmate the connecting plug and the second connector part by applying a puling force to the connecting plug.

Preferably, the counter-piece is shaped and configured for pressing the at least one latching element in a radially outwards direction. Further preferably, the counter-piece is shaped and configured for positively locking the at least one latching element in the engaged position as soon as the at least one latching element is engaged with the at least one counter-latching element. Yet further preferably, the counter-piece is shaped and configured for pressing the at least one latching element in a radially outward direction and for positively locking the at least one latching element in the engaged position as soon as the at least one latching element is engaged with the at least one counter-latching element. In this regard, the counter-piece fulfils a dual function. The counter-piece preferably serves both as a pressing element and as a locking member for the at least one latching element. The counter-piece may for example comprise an approach surface, wherein the counter-piece's approach surface is shaped and configured for pressing the at least one latching element in a radially outwards direction and for positively locking the at least one latching element in the engaged position as soon as the at least one latching element is engaged with the at least one counter-latching element. In this regard, the counter-piece preferably acts as a locking member as soon as the at least one latching element has engaged with the at least one counter-latching element.

Preferably, the at least one counter-latching element and the counter-piece are shaped and configured such that in the engaged position of the at least one latching element, a force exerted on the at least one latching element by the at least one counter-latching element and the counter-piece does not comprise a force component suited for moving the at least one latching element in a radially inwards direction. In particular, in case an external force is applied to the connecting plug, the force exerted on the at least one latching element by the at least one counter-latching element and the counter-piece does not comprise a force component suited for moving the at least one latching element in a radially inwards direction. The forces acting on the at least one latching element are not suited for disengaging the at least one latching element from the at least one counter-latching element. Hence, the engagement is locked and the locking pin cannot be pulled out of the locking sleeve.

In a preferred embodiment, the at least one counter-latching element and the counter-piece are shaped and configured such that in the engaged position of the at least one latching element, the at least one latching element is jammed between the at least one counter-latching element and the counter-piece such that the at least one latching element's engagement with the at least one counter-latching element is locked. In the engaged position, locking occurs due to the specific shape of the counter-latching element and the counter-piece.

Preferably, the at least one counter-latching element and the counter-piece are shaped and configured such that in case the at least one latching element is engaged with the at least one counter-latching element and a force is applied to the connecting plug, the at least one latching element remains in the locked state.

In a further preferred embodiment, the at least one counter-latching element is implemented as a circumferential groove comprising a second slanted approach surface. Further preferably, the counter-piece may have a first slanted approach surface, and the latching elements are jammed between the second slanted approach surface of the at least one counter-latching element and the first slanted approach surface of the counter-piece. Further preferably, the counter-piece may have a locking surface, and the latching elements are jammed between the at least one counter-latching element and the locking surface of the counter-piece. Preferably, the counter-piece has a first slanted approach surface, wherein the at least one counter-latching element is implemented as a circumferential groove comprising a second slanted approach surface, and wherein the angle of the second slanted approach surface relative to the axial direction of the locking pin is equal to or greater than the angle of the first slanted approach surface relative to the axial direction. Further preferably, the counter-piece has a locking surface, wherein the at least one counter-latching element is implemented as a circumferential groove comprising a second slanted approach surface, and wherein the angle of the second slanted approach surface relative to the axial direction of the locking pin is equal to or greater than the angle of the locking surface relative to the axial direction. Due to this geometry, a stable lock is accomplished.

According to a preferred embodiment, releasing the lock requires actuating the actuating member, wherein the actuating member is configured such that actuating the actuating member moves the at least one latching element away from the counter-piece and releases the at least one latching element.

According to a preferred embodiment, the actuating member is configured such that by actuating the actuating member, the holder element with the at least one latching element is moved away from the counter-piece and the at least one latching element is released. Hence, by actuating the actuating member, the engagement between the latching elements and the counter-latching elements is released. Preferably, the actuating member is configured such that by actuating the actuating member, the at least one latching element is released and can be moved in a radially inward direction and the locking pin can be pulled out of the locking sleeve.

Preferably, the connecting plug comprises at least one first contact element. Further preferably, the second connector part comprises at least one second contact element configured for establishing at least one electrical connection with the at least one first contact element of the connecting plug.

Preferably, the locking pin is arranged at the centre of the connector face of the connecting plug. Further preferably, the locking sleeve is arranged at the centre of the connector face of the second connector part.

Preferably, the at least one first contact element is disposed around the locking pin. Further preferably, the at least one first contact element is located radially outwards of the locking pin. Yet further preferably, the at least one first contact element is arranged on the connecting plug's connector face radially outwards of the locking pin. Preferably, the at least one second contact element is disposed around the locking sleeve. Further preferably, the at least one second contact element is arranged on the second connector part's connector face radially outwards of the locking sleeve. Yet further preferably, the at least one second contact element is located radially outwards of the locking sleeve.

According to a preferred embodiment, the second connector part comprises at least one annular contact element. Further preferably, the second connector part comprises two or more annular contact elements and annular insulating portions disposed between neighbouring annular contact elements, respectively.

Preferably, the annular contact elements are arranged concentrically to the locking sleeve of the second connector part. Further preferably, the annular contact elements and the annular insulating portions are arranged concentrically to the locking sleeve of the second connector part.

In a preferred embodiment, the connecting plug comprises at least one contact pin arranged at the connector face of the connecting plug. Further preferably, the connecting plug comprises a plurality of contact pins arranged around the locking pin. Preferably, at least one of the contact pins of the connecting plug is arranged and configured for establishing electric contacts with the at least one annular contact elements of the second connector part. Further preferably, the at least one contact pin is implemented as a spring-loaded contact pin.

Preferably, at least two of the contact pins of the connecting plug are arranged and configured for establishing an electrical contact with the same annular contact element of the second connector part. According to a preferred embodiment, the locking pin and the locking sleeve are not configured for establishing an electric connection. According to an alternatively preferred embodiment, the locking pin and the locking sleeve are configured for establishing an electric connection. Preferably, the plug-in connector part and the second connector part each comprise a shield contact.

In a preferred embodiment, the connecting plug is an angular connector. Preferably, a cable orientation of the connecting plug is at an angle of between 60 and 120 degrees relatively to the normal to the connector face of the connecting plug. Yet further preferably, the cable orientation is an angle of about 90 degrees relatively to the normal to the connector face of the connecting plug.

In a preferred embodiment, the connecting plug is configured for being mated with the second connector part in any angular orientation with respect to the axial direction of the second connector part. According to an alternatively preferred embodiment, the connecting plug is configured for being mated with the second connector part in one out of a set of different angular orientations with respect to the axial direction of the second connector part.

Preferably, the second connector part is rotationally symmetric. According to an alternatively preferred embodiment, the second connector part is n-fold rotationally symmetric.

Preferably, the plug-in connector is used in the field of wearable technology. Further preferably, the second connector part is configured for being fastened to clothing. Preferably, the second connector part is washable.

According to a preferred embodiment, the second connector part is hermetically sealed using a casting compound. Further preferably, the connecting plug is hermetically sealed using a casting compound. In a preferred embodiment, the connection between the connecting plug and the second connector part is sealed with o-rings.

Preferably, the annular contact elements and the annular insulating portions form a smooth surface of the second connector part. Preferably, the annular contact elements and the annular insulating portions form a concave shaped or funnel-shaped surface of the second connector part. For example, the concave shaped or funnel-shaped surface may be configured for guiding the locking pin of the connecting plug to the locking sleeve of the second connector part. According to a preferred embodiment, the locking pin comprises a cap at its front end. Preferably, the cap is made of a material suited for preventing damages to the second connector part's surface. Preferably, the cap is made of plastic material. Preferably, the locking sleeve extends entirely through the second connector part.

Connecting Plug with at Least One Springy Latching Element or at Least One Latching Element Preloaded by a Spring Force According to a preferred embodiment, the at least one latching element is implemented as at least one leaf spring.

Preferably, the at least one leaf spring comprises at least one U-shaped and/or omega-shaped leaf spring. Further preferably, portions of the at least one leaf spring are configured for engaging with the at least one counter-latching element of the locking sleeve when the locking pin is inserted into the locking sleeve.

Preferably, the at least one latching element and the at least one counter-latching element are shaped and configured such that the at least one latching element is positively locked as soon as the at least one latching element is engaged with the at least one counter-latching element.

Preferably, the at least one latching element and the at least one counter-latching element are shaped such that the at least one latching element cannot be disengaged from the at least one counter-latching element by applying a force to the locking pin.

Preferably, the at least one leaf spring and the at least one counter-latching element are shaped such that the at least one latching element cannot be disengaged from the at least one counter-latching element without actuating the actuating member.

Preferably, the actuating member is movably arranged in or at the locking pin such that the actuating member is movable in the axial direction of the locking pin relative to the at least one latching element.

Preferably, actuation of the actuating member is performed against a spring force of a spring element. Further preferably, the actuating member is configured for interacting with the at least one latching element in a way that upon actuation of the actuating member, at least portions of the at least one latching element are moved in a radially inwards direction and disengage from the at least one counter-latching element. Further preferably, the actuating member is configured for interacting with the at least one latching element in a way that upon actuation of the actuating member, at least part of the at least one latching element is elastically deformed.

Preferably, the at least one leaf spring comprises at least one U-shaped or omega shaped leaf spring, wherein the actuating member comprises at least one actuating arm that extends predominantly in the axial direction, wherein the at least one actuating arm is configured for interacting with the at least one leaf spring such that when the actuating member is actuated, the legs of at least one of the U-shaped or omega shaped leaf springs are pulled in a radially inwards direction.

BRIEF DESCRIPTION OF THE DRAWING

The invention is illustrated in greater detail with the aid of schematic drawings.

It shows schematically:

FIG. 1 shows a plug-in connector comprising a connecting plug and a second connector part.

FIG. 2A shows the back end of the connecting plug.

FIG. 2B shows the front end of the connecting plug.

FIG. 3A shows the front end of the second connector part.

FIG. 3B shows the back end of the second connector part.

DETAILED DESCRIPTION OF EMBODIMENTS OF THE INVENTION

Figure 4:
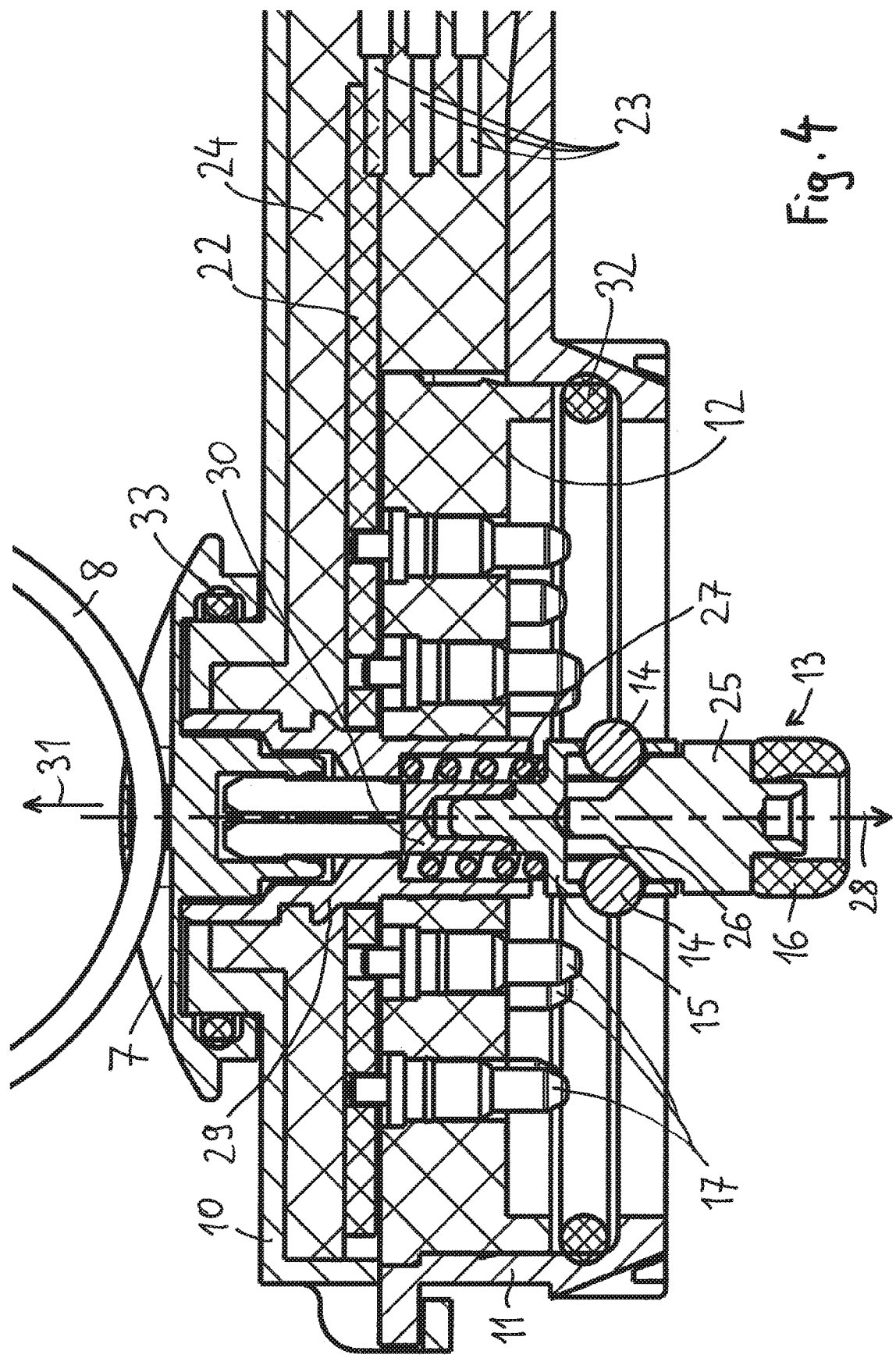
FIG. 4 shows a cross-section of the connecting plug.

In the following description of preferred embodiments of the present invention, identical reference numerals denote identical or comparable components.

FIG. 1 shows a plug-in connector comprising a connecting plug 1 and a second connector part 2, wherein the connecting plug 1 and the second connector part 2 can be mated in an axial direction 3. In FIGS. 2A and 2B, the back end and the front end of the connecting plug 1 are shown. FIGS. 3A and 3B depict a front end and a back end of the second connector part 2.

The connecting plug 1 is implemented as an angular connector and comprises a cable outlet 4 for the cable 5, with the cable 5 being fixed by a fixing ring 6. At the back end of the connecting plug 1, an actuating member 7 with a ring 8 is arranged, wherein said actuating member 7 can be pulled in a direction opposite to the connecting plug's mating direction, as indicated by arrow 9. The housing of the connecting plug 1 comprises a first housing part 10 and a second housing part 11.

FIG. 2B shows the connector face 12 of the connecting plug 1. At the center of the connector face 12, a locking pin 13 is arranged. A ball 14 supported by a ball cage 15 serves as a latching element. At the front end of the locking pin 13, a cap 16 is arranged, wherein the cap 16 may for example be made of plastic material. A plurality of contact pins 17 are arranged around the locking pin 13, wherein the contact pins 17 are preferably realised as spring-loaded contact pins.

FIG. 3A shows the connector face 18 of the second connector part 2. At the center of the connector face 18, a locking sleeve 19 is located. When the connecting plug 1 is mated with the second connector part 2, the locking pin 13 is inserted into the corresponding locking sleeve 19, in order to latch and lock the connecting plug 1 relative to the second connector part 2. The connector face 18 of the second connector part 2 comprises a plurality of annular contact elements 20 which are arranged concentrically around the locking sleeve 19, with the locking sleeve 19 being located at the center. Hence, the locking pin 13 and the locking sleeve 19 are configured for establishing a secure mechanical connection between the connecting plug 1 and the second connector part 2.

The contact pins 17 and the annular contact elements 20 are configured for establishing a plurality of electrical connections when the connecting plug 1 is mated with the second connector part 2. In particular, each of the contact pins 17 is configured for establishing an electrical contact with a corresponding annular contact element 20. To achieve a reliable electrical contact between the contact pins 17 and the annular contact elements 20, two or more contact pins 17 are provided for each annular contact element 20, so that the electrical connection is established via two or more contact pins 17. In this way, each of the plurality of annular contact elements 20 can be electrically contacted by corresponding contact pins 17.

Because of the annular contact elements 20 arranged concentrically around the locking sleeve 19, the connecting plug 1 can be mated with the second connector part 2 in any angular orientation of the connecting plug 1 relative to the second connector part 2 with respect to the axial direction 3. The second connector part 2 may for example be realized as a rotationally symmetric connector part. In alternative embodiments, the number of possible orientations of the connecting plug relative to the second connector part may be restricted to a number of predefined orientations.

FIG. 3B shows the back end of the second connector part 2. It can be seen that the locking sleeve 19 extends entirely through the second connector part 2. Alternatively, the locking sleeve 19 may only extend partially through the second connector part 2. Furthermore, on the back side of the second connector part 2, a plurality of connection pins 21 are arranged, said connection pins 21 being electrically connected with respective ones of the annular contact elements 20.

When mating the connecting plug 1 with the second connector part 2, the locking pin 13 is inserted into the locking sleeve 19 until the pin and the sleeve latch and lock. Mating the connecting plug 1 with the second connector part 2 is performed without actuating the actuating member 7. Mating of the connecting plug and the second connector part can be performed even in case the user pushes on the actuating member 7 during the mating process. As soon as the locking pin 13 has engaged with the locking sleeve 19, it is no longer possible to unmate the connecting plug 1 and the second connector part 2, it is necessary to unlock the engagement between the locking pin 13 and the locking sleeve 19 by pulling the actuating member 7 in the direction indicated by arrow 9, for example by pulling the ring 8. Now, the engagement between the locking pin 13 and the locking sleeve 19 is unlocked, the locking pin 13 can be pulled out of the locking sleeve 19 and the two connector parts can be separated.

A plug-in connector of the type shown in FIGS. 1, 2A, 2B, 3A, 3B may for example be used in the field of wearable technology, for example for connecting different electrical devices worn on the body or integrated into the clothing. For example, the second connecting part 2 may be fastened to a piece of clothing, for example to a vest. Thus, devices worn on the body may for example be connected with devices integrated into a helmet. Use of the plug-in connector shown in FIGS. 1, 2A, 2B, 3A, 3B is not limited to the field of wearable technology, though. The plug-in connector may be used in other technical fields as well.

FIG. 4 shows a cross-section of the connecting plug 1. The housing of the connecting plug 1 comprises the first housing part 10 and the second housing part 11. The locking pin 13 is located at the centre of the connector face 12, with a plurality of spring-loaded contact pins 17 being arranged around the locking pin 13. A cap 16 is arranged at the tip of the locking pin 13. The contact pins 17 are electrically connected with conducting paths of a circuit board 22. Wire strands 23 of the cable 5 are connected to the conducting paths of the circuit board 22 as well, such that electrical connections are established between the wire strands 23 and the contact pins 17. A casting compound 24 may be used for insulating the circuit board 22 inside the connecting plug 1 and for encapsulating the connecting plug 1.

The latching and locking mechanism is integrated into the locking pin 13. The locking pin 13 comprises the ball cage 15 with the balls 14 that is movably arranged in the locking pin 13, wherein the ball cage 15 is movable in the axial direction. The locking pin 13 further comprises a stationary counter-piece 25 with a first slanted approach surface 26.

In the example of FIG. 4, the locking pin 13 comprises a coil spring 27 configured for resiliently pressing the ball cage 15 with the balls 14 against the counter-piece 25 in the mating direction 28. The coil spring 27 rests on a circumferential recess of the inner sleeve 29 and is configured for resiliently pressing the ball cage 15 with the balls 14 in the direction towards the counter-piece 25. As a consequence, the first slanted approach surface 26 of the counter-piece 25 acts on the balls 14 and presses the balls 14 in a radially outward direction.

The ball cage 15 is firmly connected with the actuating member 7 via an intermediate part 30. In the example of FIG. 4, the intermediate part 30 is connected to the ball cage 15 via a press-fit. In addition, a snap-fit connection is established between the intermediate part 30 and the actuating member 7. The firm mechanical connection between the ball cage 15, the intermediate part 30 and the actuating member 7 may as well be realized in a different manner. For example, the ball cage 15 and the intermediate part 30 may be formed in one piece. As a further example, the ball cage 15, the intermediate part 30 and the actuating member may be formed in one piece. When the actuating member 7 is pulled in the upward direction as indicated by arrow 31, the ball cage 15 is moved against the spring force exerted by the coil spring 27 in a direction away from the counter-piece 25.

When inserting the locking pin 13 into the locking sleeve 19, the balls 14 are pressed in a radially inward direction by the walls of the locking sleeve 19 and the ball cage 15 is pushed upwards against the spring force of the coil spring 27. Therefore, for inserting the locking pin 13 into the locking sleeve 19, it is not required to actuate the actuating member 7. Pushing on the actuating member 7 when the locking pin 13 is inserted into the locking sleeve 19 does not disturb the mating process. So even if the user pushes on the actuating member 7 during the mating process, the connecting plug 1 and the second connector part 2 can be mated.

The connecting plug 1 further comprises an O-ring 32 for sealing the connecting plug 1 relative to the second connector part 2 and an O-ring 33 configured for sealing the actuating member 7 relative to the first housing part 10.

Figure 5:
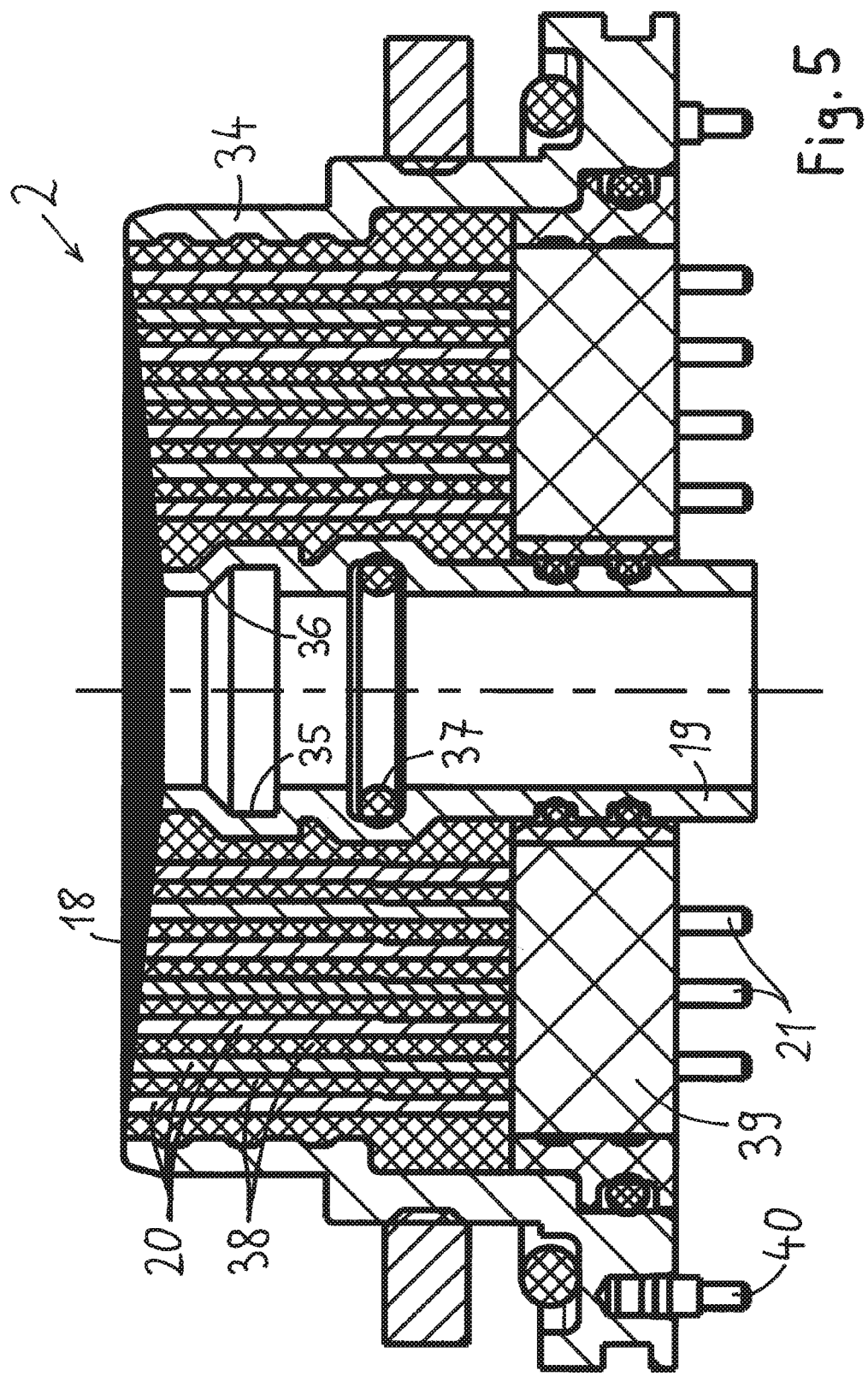
FIG. 5 shows a cross-section of the second connector part.

FIG. 5 shows a cross-section of the second connector part 2. The second connector part 2 comprises a housing 34. At the centre of the connector face 18, the locking sleeve 19 is located. The locking sleeve 19 comprises a circumferential groove 35, which serves as a counter-latching element for the balls 14. The circumferential groove 35 comprises a second slanted approach surface 36. When the locking pin 13 is inserted into the locking sleeve 19, the balls 14 engage with the circumferential groove 35.

In the interior of the locking sleeve 19, an O-ring 37 is located. When the locking pin 13 is inserted into the locking sleeve 19, the O-ring 37 is configured for establishing a seal between the locking pin 13 and the locking sleeve 19.

A plurality of annular contact elements 20 is arranged concentrically to locking sleeve 19. Between neighbouring annular contact elements 20, annular insulating layers 38 are arranged to provide an electric insulation between neighbouring annular contact elements 20. The annular contact elements 20 extend to the connector face 18 of the second connector part 2 and are configured for establishing a plurality of electrical contacts with the contact pins 17 of the connecting plug 1. Preferably, the annular contact elements 20 are disposed in a concentric arrangement around the locking sleeve 19. Preferably, the connector face 18 has a smooth surface that is formed by the annular contact elements 20 and the annular insulating layers 38. Further preferably, the connector face 18 is implemented as a concave surface or as a funnel-shaped surface. Thus, when the connecting plug 1 is mated with the second connector part 2, the locking pin 13 may slide along the concave surface of the connector face 18 and is guided to the locking sleeve 19. At the back end of the second connector part 2, a plurality of connection pins 21 is located, said connection pins 21 being electrically connected with the annular contact elements 20. In order to hermetically seal the annular contact elements 20 and the annular insulating layers 38 relative to the environment, a casting compound 39 may be used. The second connector part further comprises at least one shield contact element 40 configured for electrically contacting the housing 34.

Figure 6:
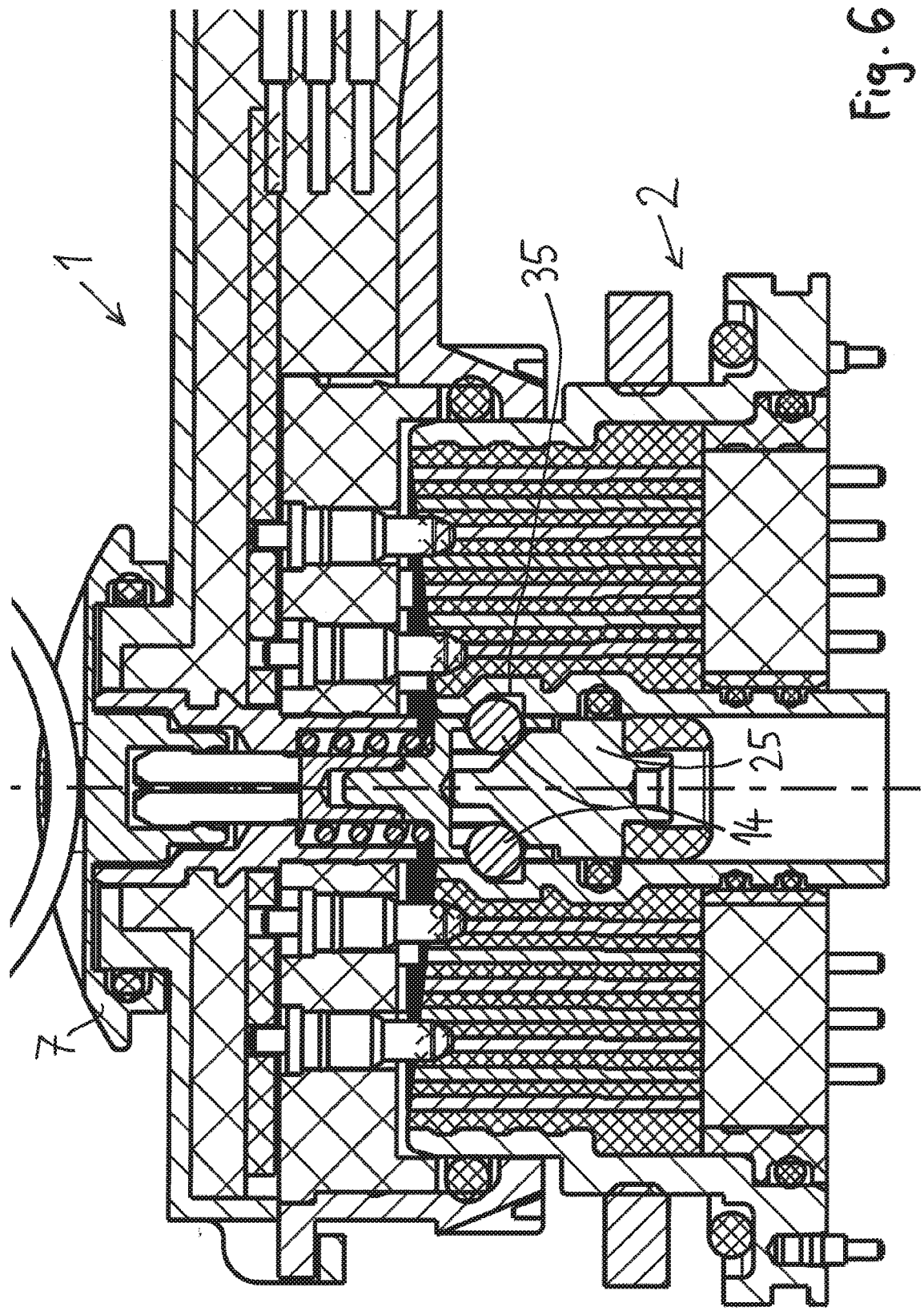
FIG. 6 shows a cross-section of the connecting plug and the second connector part in the mated state.

FIG. 6 shows a cross-section of the connecting plug 1 and the second connector part 2 after the connecting plug 1 and the second connector part 2 have been mated. It can be seen that the locking pin 13 is inserted into the locking sleeve 19 and the balls 14 have moved in a radially outward direction and are in engagement with the circumferential groove 35. In particular, it can be seen that the balls 14 are blocked and jammed between the first slanted approach surface 26 of the counter-piece 25 and the second slanted approach surface 36 of the circumferential groove 35. The balls 14 are not only latched, but also locked between the counter-piece 25 and the circumferential groove 35. As a result, the locking pin 13 cannot be pulled out of the locking sleeve 19. When applying a force to the locking pin 13, the counter-piece 25, which is firmly attached to the locking pin 13, is pressed against the balls 14, but this force exerted by the first slanted approach surface 26 does not incur any movement of the balls 14 in the radially inward direction. In fact, the force exerted on the balls 14 by the first slanted approach surface 26 and the second slanted approach surface 36 does not comprise any component that is capable of moving the balls 14 in a radially inward direction along the first slanted approach surface 26, because the angle between the second slanted approach surface 36 and the axis 3 is larger than or equal to the angle of the first slanted approach surface 26 relative to the axis 3. For this reason, the balls 14 are blocked between the second slanted approach surface 36 and the first slanted approach surface 26 and the engagement of the balls 14 with the circumferential groove 35 is locked.

For unlocking this lock, it is required to actuate the actuating member 7 by pulling the ring 8 in a direction indicated by arrow 31. As a consequence, the ball cage 15 is moved away from the counter-piece 25 against the spring force exerted by the coil spring 27. The balls 14 are urged by the second slanted approach surface 36 in a radially inward direction. Thus, the engagement between the balls 14 and the circumferential groove 35 is disengaged, the locking pin 13 can be pulled out of the locking sleeve 19, and the connecting plug 1 and the second connector part 2 can be disconnected. Unmating the two connector parts requires pulling the actuating member 7 in a direction opposite to the mating direction 28. In this way, the locking mechanism of the locking pin 13 ensures a safe and reliable mechanical connection between the connecting plug 1 and the second connector part 2.

Figure 7:
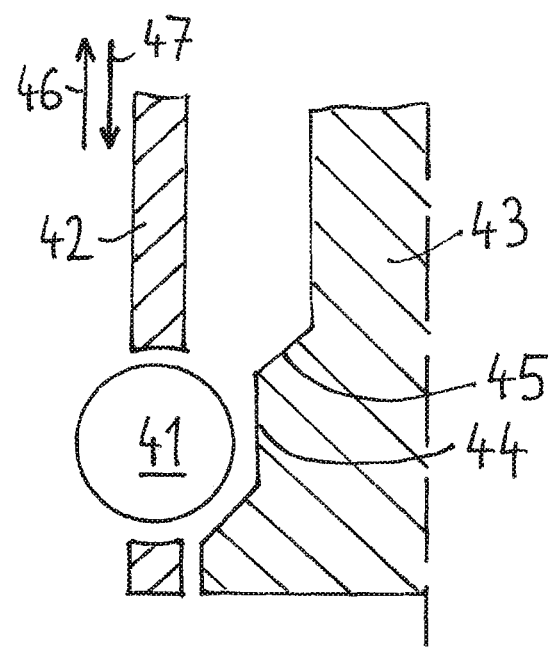
FIG. 7 shows an alternative example of a counter-piece.

In the alternative embodiment shown in FIG. 7, a ball 41 is supported by a ball cage 42 and interacts with a counter-piece 43. The counter-piece 43 shown in FIG. 7 comprises a cylindrical locking surface 44 and a third slanted approach surface 45. When inserting the locking pin into the locking sleeve, the ball 41 is hindered from moving in a radially inwards direction, because it abuts the cylindrical locking surface 44. Therefore, when the locking pin is inserted into the locking sleeve, the ball 41 and the ball cage 42 are pushed relative to the counter-piece 43 against the spring force of the coil spring, as indicated by arrow 46. As soon as the ball 41 reaches the third slanted approach surface 45, it can move in a radially inwards direction. Now, the locking pin can be inserted into the locking sleeve.

When the ball 41 reaches the counter-latching element of the locking sleeve, it engages with the counter-latching element and moves in a radially outwards direction. As soon as the ball 41 has engaged with the counter-latching element, the ball cage 42 with the ball 41 is moved back to its initial position, as indicated by arrow 47. Now, the ball 41 is locked in the engaged state by the cylindrical locking surface 44. For releasing the lock, it is required to actuate the actuating member 7. Upon actuating the actuating member 7, the ball cage 42 with the ball 41 is moved in the direction of arrow 46. As soon as the ball 41 reaches the third slanted approach surface 45, the ball 41 is disengaged from the counter-latching element and the locking pin can be pulled out of the locking sleeve.

Figure 8:
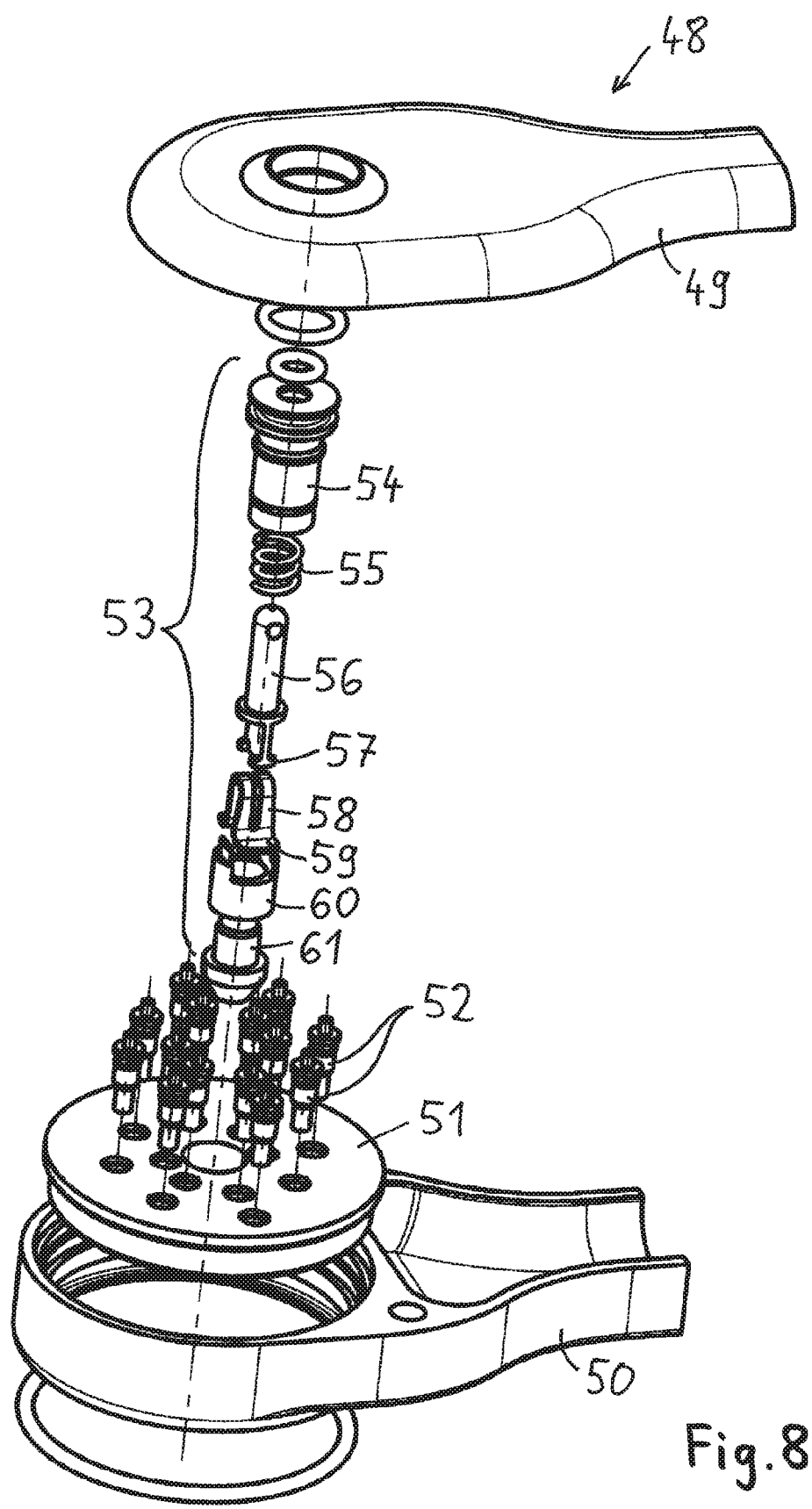
FIG. 8 shows an exploded view of a connecting plug according to a second embodiment of the invention.

In FIG. 8, a connecting plug according to yet another embodiment of the invention is shown. FIG. 8 shows an exploded view of the connecting plug 48. The connecting plug 48 comprises a first housing part 49, a second housing part 50 and an insulation body 51, with the contact pins 52 and the locking pin 53 being attached to the insulation body 51. The locking pin 53 comprises an inner sleeve 54, a coil spring 55 and an actuating member 56 that is movably arranged in the locking pin 53, with two actuating arms 57 extending predominantly in the axial direction. The locking pin 53 further comprises a leaf spring 58, preferably a U-shaped or omega-shaped leaf spring 58 comprising projections 59 configured for engaging with a corresponding counter-latching element when the locking pin 53 is inserted into a locking sleeve of a second connector part. The locking pin 53 further comprises a front part 60 and a cap element 61.

The connecting plug 48 is configured for being mated with a second connector part. The second connector part comprises a locking sleeve at its centre and a plurality of angular contact elements arranged around the locking sleeve. The locking sleeve comprises a circumferential groove that serves as a counter-latching element for the projections 59 of the leaf spring 58. When the locking pin 53 is pushed into the locking sleeve, the projections 59 of the leaf spring 58 are resiliently pressed in a radially outward direction and will therefore engage with the circumferential groove. The projections 59 and the circumferential groove are shaped and configured such that the locking pin 53 cannot disengage from the circumferential groove by applying a force to the locking pin 53. In particular, the circumferential groove of the locking sleeve does not comprise a slanted approach surface. Accordingly, it is not possible to unmate the connecting plug 48 and the corresponding second connector part without actuating the actuating member 56. Releasing the lock requires actuating the actuating member 56 and pulling the actuating member 56 in the axial direction. The actuating member 56 is moved against the spring force exerted by the coil spring 55. The actuating arms 57 interact with the legs of the U-shaped or omega-shaped leaf spring 58 and pull the projections 59 in a radially inward direction. As a result, the projections 59 disengage from the circumferential groove and the locking pin 53 can be pulled out of the locking sleeve.

The features described in the above description, claims and figures can be relevant to the invention in any combination. Their reference numerals in the claims have merely been introduced to facilitate reading of the claims. They are by no means meant to be limiting.

LIST OF REFERENCE NUMERALS 1 connecting plug
2 second connector part
3 axial direction
4 cable outlet
5 cable
6 fixing ring
7 actuating member
8 ring
9 arrow
10 first housing part
11 second housing part
12 connector face
13 locking pin
14 ball
15 ball cage
16 cap
17 contact pins
18 connector face
19 locking sleeve
20 annular contact elements
21 connection pins
22 circuit board
23 wire strands
24 casting compound
25 counter-piece
26 first slanted approach surface
27 coil spring
28 mating direction
29 inner sleeve
30 intermediate part
31 arrow
32 O-ring
33 O-ring
34 housing
35 circumferential groove
36 second slanted approach surface
37 O-ring
38 annular insulating layers
39 casting compound
40 shield contact element
41 ball
42 ball cage
43 counter-piece
44 cylindrical locking surface
45 third slanted approach surface
46 arrow
47 arrow
48 connecting plug
49 first housing part
50 second housing part
51 insulation body
52 contact pins
53 locking pin
54 inner sleeve
55 coil spring
56 actuating member
57 actuating arms
58 leaf spring
59 projections
60 front part
61 cap element

The invention claimed is:
1. A connecting plug, comprising:
a locking pin arranged at a connector face of the connecting plug, the locking pin comprising at least one latching element and a counter-piece,
wherein the at least one latching element is configured for engaging with at least one counter-latching element of a second connector part,
wherein the locking pin comprises a spring element configured for resiliently pressing the at least one latching element and the counter-piece against each other,
wherein the counter-piece is shaped and configured for pressing the at least one latching element in a radially outward direction and for positively locking the at least one latching element in the engaged position when the at least one latching element is engaged with the at least one counter-latching element, and
wherein the connecting plug comprises an actuating member configured for unlocking, upon actuation, an engagement between the at least one latching element and the at least one counter-latching element and for releasing the at least one latching element, the actuating member being configured to be actuated by pulling the actuating member in the axial direction of the connecting plug.

2. The connecting plug according to claim 1, wherein the actuating member is configured for being movable in an axial direction of the connecting plug.

3. The connecting plug according to claim 1, wherein the actuating member is configured such that actuating the actuating member causes a relative movement between the at least one latching element and the counter-piece in the axial direction.

4. The connecting plug according to claim 1, wherein the locking pin comprises a holder element configured for holding the at least one latching element.

5. The connecting plug according to claim 1, wherein the connecting plug is an angular connector.

6. The plug-in connector, comprising:
a connecting plug, according to claim 1 and
a second connector part,
wherein the connecting plug comprises
at least one first contact element disposed around the locking pin,
wherein the second connector part comprises
a locking sleeve with at least one counter-latching element, wherein the locking sleeve is configured for accepting the locking pin when the connecting plug is mated with the second connector part,
wherein the at least one latching element is configured for engaging with the at least one counter-latching element of the locking sleeve,
at least one second contact element configured for electrically contacting the at least one first contact element,
wherein the locking pin and the locking sleeve are shaped and configured for positively locking the at least one latching element when the at least one latching element is engaged with the at least one counter-latching element,
wherein the locking pin and the locking sleeve is shaped and configured such that disengagement of the at least one latching element requires actuation of the actuating member,
wherein the locking pin is configured for being inserted into the locking sleeve without actuating the actuating member.

7. A plug-in connector, comprising:
a connecting plug, according to claim 1 and
a second connector part,
wherein the second connector part comprises
a locking sleeve with at least one counter-latching element, the locking sleeve being configured for accepting the locking pin when the connecting plug is mated with the second connector part,
wherein the at least one latching element is configured for engaging with the at least one counter-latching element of the second connector part,
wherein the counter-piece is shaped and configured for positively locking the at least one latching element in the engaged position,
wherein the at least one counter-latching element and the counter-piece are shaped and configured such that in the engaged position of the at least one latching element, a force exerted on the at least one latching element by the at least one counter-latching element and the counter-piece does not comprise a force component suited for moving the at least one latching element in a radially inwards direction.

8. A plug-in connector, comprising:
a connecting plug, according to claim 1 and
a second connector part,
wherein the connecting plug comprises
at least one first contact element,
wherein the second connector part comprises
a locking sleeve with at least one counter-latching element, the locking sleeve being configured for accepting the locking pin when the connecting plug is mated with the second connector part,
wherein the at least one latching element is configured for engaging with the at least one counter-latching element of the locking sleeve, and
wherein the second connector part comprises at least one annular contact element configured for electrically contacting the at least one first contact element,
wherein the connecting plug is an angular connector.

9. A plug-in connector, according to claim 1 comprising:
a connecting plug, and
a second connector part,
wherein the connecting plug comprises
at least one first contact element disposed around the locking pin, and
an actuating member movably arranged in or at the locking pin,
wherein the second connector part comprises
a locking sleeve with at least one counter-latching element, the locking sleeve being configured for accepting the locking pin when the connecting plug is mated with the second connector part,
wherein the at least one latching element is configured for engaging with the at least one counter-latching element of the locking sleeve, wherein the at least one latching element and the at least one counter-latching element are shaped and configured such that the at least one latching element is positively locked when the at least one latching element is engaged with the at least one counter-latching element,
at least one second contact element for electrically contacting the at least one first contact element,
wherein the at least one latching element is at least one springy latching element or at least one latching element preloaded by a spring force, the at least one latching element) being configured for being resiliently pressed in a radially outward direction of the locking pin,
wherein the actuating member is configured for interacting with the at least one latching element in a way that upon actuation of the actuating member, at least portions of the at least one latching element are moved in a radially inwards direction and disengage from the at least one counter-latching element.

10. The connecting plug according to claim 4, wherein the holder element with the at least one latching element is movably arranged in or at the locking pin and wherein the counter-piece is fixed to the locking pin.

11. The connecting plug according to claim 10, wherein the locking pin is configured such that in an engaged position of the at least one latching element the at least one latching element is releasable by moving the holder element relative to the counter-piece.

12. The connecting plug according to claim 4, wherein the holder element is a ball cage configured for holding at least one ball.

13. The plug-in connector according to claim 6, wherein the locking pin further comprises
a counter-piece, and
a spring element configured for resiliently pressing the at least one latching element and the counter-piece against each other, wherein the counter-piece is shaped and configured for pressing the at least one latching element in a radially outward direction and for positively locking the at least one latching element in an engaged position when the at least one latching element is engaged with the at least one counter-latching element.

14. The plug-in connector according to claim 6, wherein the at least one latching element is implemented as at least one springy latching element or as at least one latching element preloaded by a spring force, the at least one latching element being configured for being resiliently pressed in a radially outward direction of the locking pin, wherein the actuating member is configured for interacting with the at least one latching element in a way that upon actuation of the actuating member, at least portions of the at least one latching element are moved in a radially inwards direction and disengage from the at least one counter-latching element.

15. A connecting plug, comprising:
a locking pin with at least one latching element,
a holder element for holding the at least one latching element and
a counter-piece for resiliently pressing the at least one latching element in a radially outwards direction,
wherein the at least one latching element is configured for engaging with at least one counter-latching element of a second connector part, wherein the counter-piece is shaped and configured for positively locking the at least one latching element in the engaged position,
wherein the holder element with the at least one latching element is movably arranged in or at the locking pin and the counter-piece is fixed to the locking pin,
wherein the locking pin is configured such that in an engaged position of the at least one latching element, the at least one latching element can be released by moving the holder element relative to the counter-piece.

\* \* \* \* \*